No. 686,496. Patented Nov. 12, 1901.
A. J. WEST.
COMBINED CULTIVATOR, PLANTER, AND FERTILIZER DISTRIBUTER.
(Application filed Feb. 26, 1901.)
(No Model.) 3 Sheets—Sheet 1.
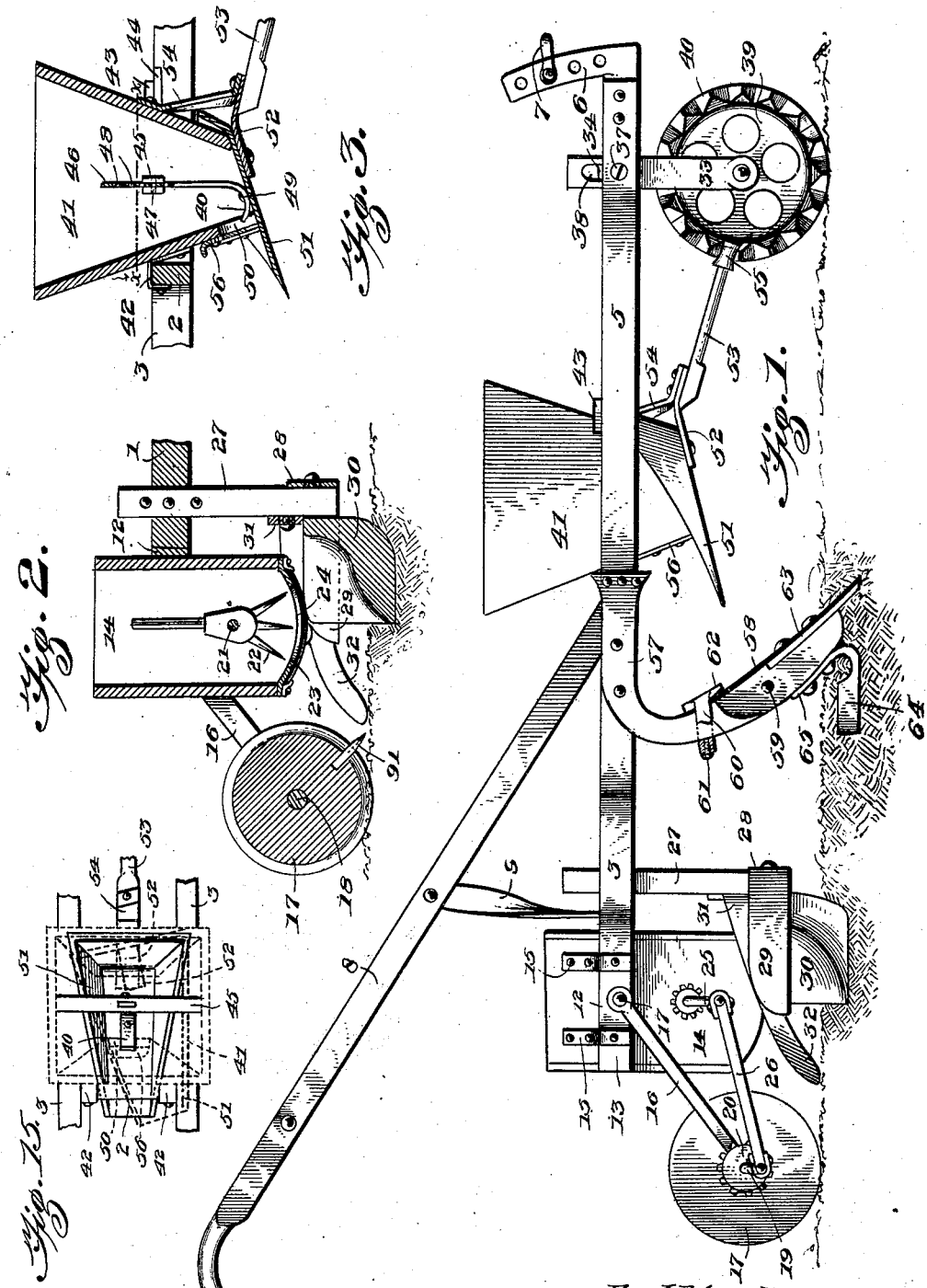
Witnesses
A. J. West, Inventor
Attorneys

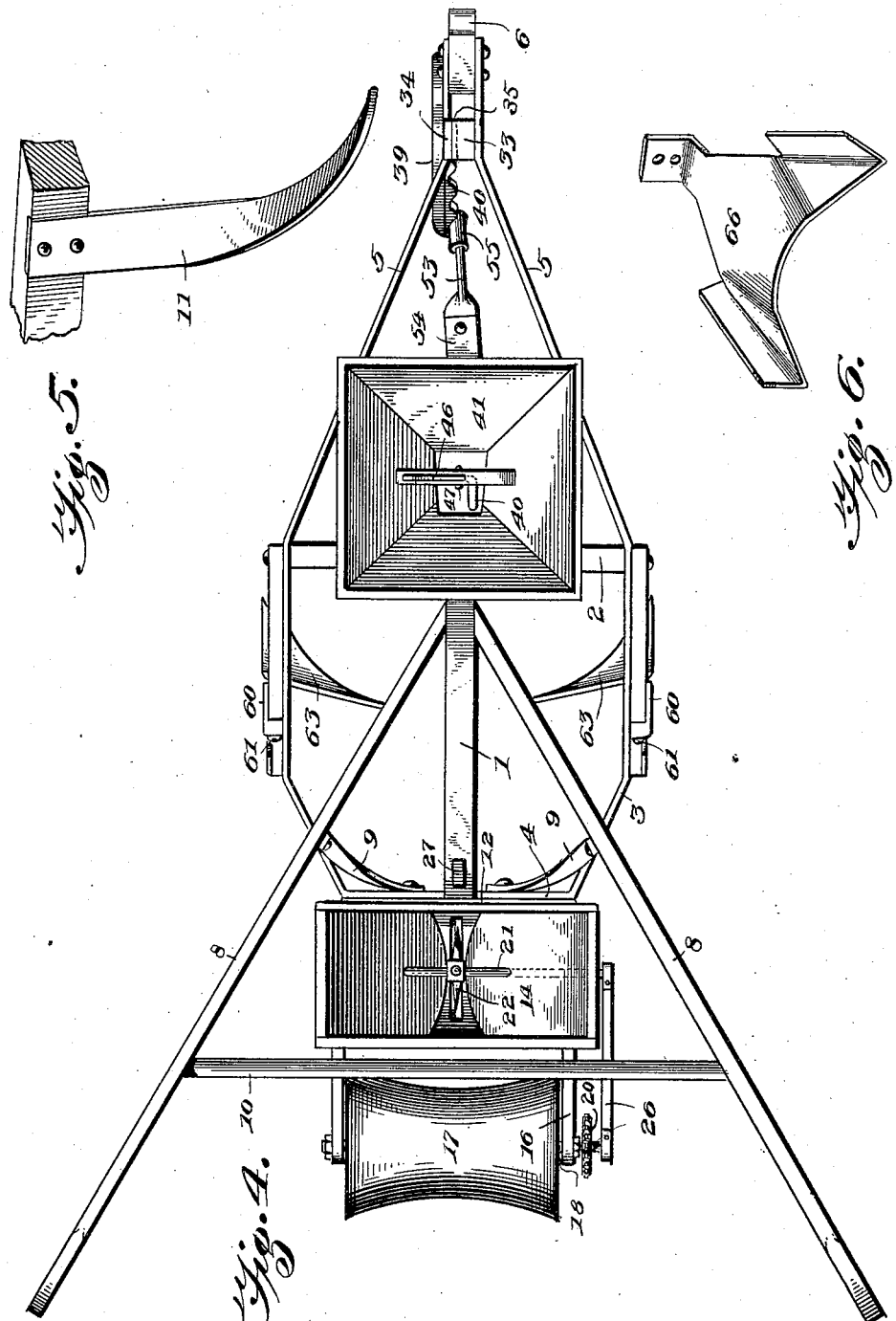

No. 686,496. Patented Nov. 12, 1901.
A. J. WEST.
COMBINED CULTIVATOR, PLANTER, AND FERTILIZER DISTRIBUTER.
(Application filed Feb. 26, 1901.)
(No Model.) 3 Sheets—Sheet 3.
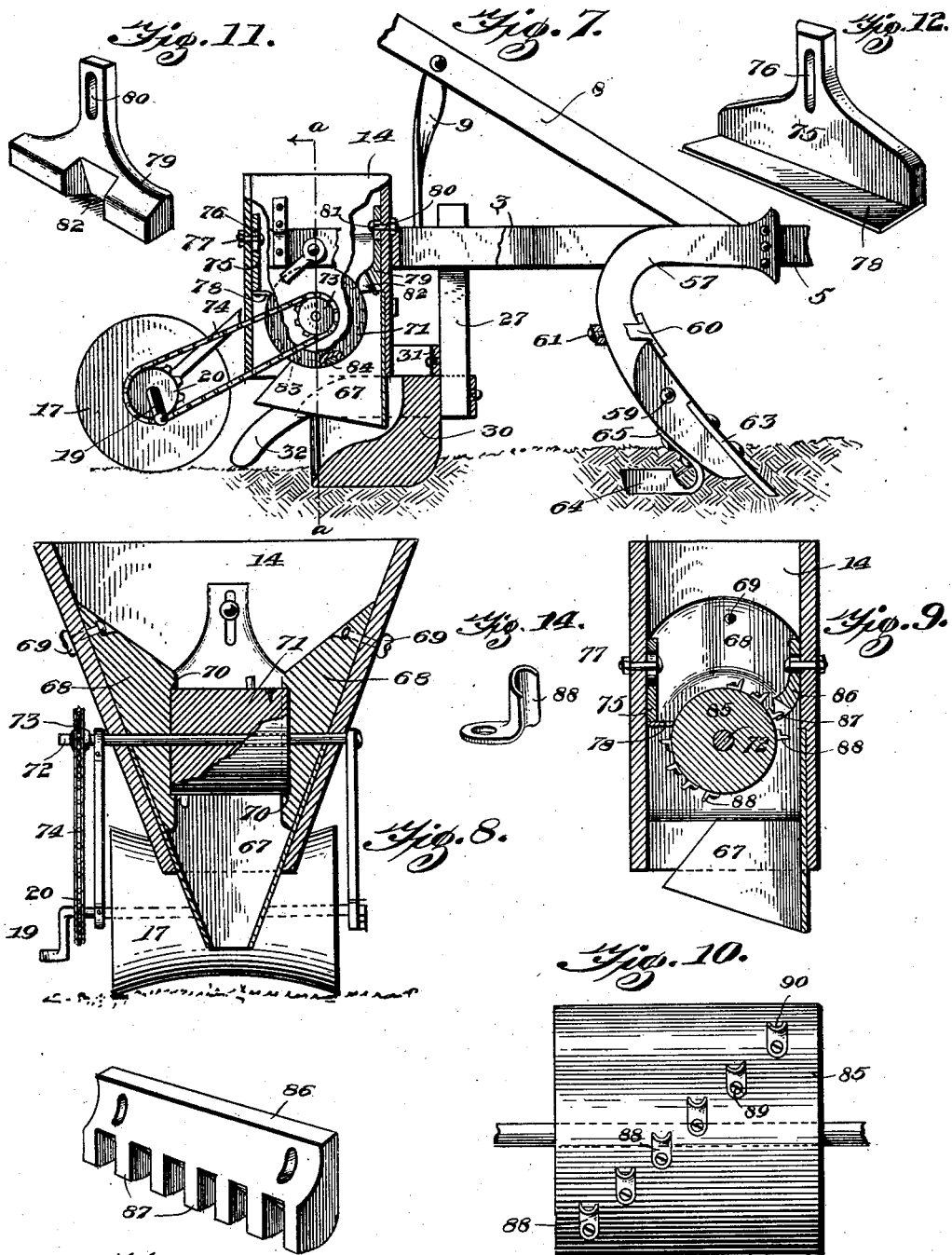

UNITED STATES PATENT OFFICE.

ANDREW J. WEST, OF MULLINS, SOUTH CAROLINA.

COMBINED CULTIVATOR, PLANTER, AND FERTILIZER-DISTRIBUTER.

SPECIFICATION forming part of Letters Patent No. 686,496, dated November 12, 1901.

Application filed February 26, 1901. Serial No. 48,914. (No model.)

*To all whom it may concern:*

Be it known that I, ANDREW J. WEST, a citizen of the United States, residing at Mullins, in the county of Marion and State of South Carolina, have invenied a new and useful Combined Cultivator, Planter, and Fertilizer-Distributer, of which the following is a specification.

My invention is an improved combined cultivator, planter, and fertilizer - distributer; and it consists in the peculiar construction and combination of devices hereinafter fully set forth and claimed.

In the accompanying drawings, Figure 1 is a side elevation of my invention, showing the same organized as a combined fertilizer-distributer and cotton-planter. Fig. 2 is a detail vertical longitudinal sectional view of the same, showing the cotton-seed hopper and its coacting parts. Fig. 3 is a similar view taken through the fertilizer-hopper. Fig. 4 is a top plan view of my combined cultivator, planter, and fertilizer-distributer, showing the same organized and adapted for operation in distributing fertilizer and planting cotton-seed. Fig. 5 is a detail perspective view of a portion of one of the side bars of the frame, showing a cultivating-tooth attached thereto. Fig. 6 is a detail perspective view of a sweep for forming ridges over the planted tobacco or other seeds. Fig. 7 is a longitudinal sectional view showing the machine organized for planting corn and other seeds. Fig. 8 is a transverse sectional view of the same, taken on a plane indicated by the line *a a* of Fig. 7. Fig. 9 is a detail sectional view taken through the hopper and showing the same provided with means for planting cotton-seeds which have been ginned. Fig. 10 is a detail top plan view of the seed-cylinder for planting ginned cotton-seeds. Fig. 11 is a detail perspective view of the feed-gage which coöperates with the corn-planting cylinder. Fig. 12 is a similar view of the adjustable plate, that coacts with the seed-cylinder. Fig. 13 is a detail perspective view of the feed-gage which coöperates with the cotton-seed-planting cylinder. Fig. 14 is a detail perspective view of one of the cotton-seed-planting cups or spurs.

I will first describe the construction of the main frame. To the front end of a longitudinal beam 1 of suitable length is secured a cross-bar 2, which extends in opposite directions from said beam 1, the front end of the latter being at the center of said cross-bar 2. Side bars 3, which are preferably made of bar iron or steel, have their front ends attached to the cross-bar 2, at the outer ends thereof, said side bars 3 extending rearward parallel with the beam 1 and on opposite sides thereof and having their rear ends turned inward, as at 4. Forward-converging bars 5 are attached to the ends of the cross-bar 2, and between the front ends of the same is secured a draft-bar 6, which is provided with a suitable clevis 7. A pair of handles 8 have tneir front ends bolted to opposite sides of the beam 1, near the front end of the latter. The rear portions of said handles are supported by braces 9, and said handles are connected together by the usual rung 10. When the implement is to be used for the purpose of a cultivator, suitable cultivating - teeth, such as are shown at 11 in Fig. 5, are attached to the beam 1 and side bars 3 of the frame.

To the rear end of the beam 1 and to the inturned rear ends 4 of the side bars 3 is bolted or otherwise secured a U-shaped supporting-yoke 12, the side bars 13 of which extend rearwardly. A seed-hopper 14 is supported in the said yoke by any suitable means. As here shown, the downwardly-converging side walls of the said hopper are provided with straps 15, the latter being bolted thereto and also bolted to the said arms or bars 13. Links 16 have their front ends pivotally connected to the bars 13, as at 17. Said links extend rearwardly from the said yoke, and a covering-roller 17 has its shaft 18 journaled in bearings in the rear ends of said links. The face of the said covering-roller is concaved, as shown. The shaft of said roller has at one end a crank 19 and a sprocket-wheel 20. A shaft 21 is mounted in and adapted to be unshipped from bearings in the side walls of hopper 14. Said shaft is provided with stirrers 22, which coact with and are above the curved bottom plate 23 of the hopper, which is removable therefrom and has a longitudinal slot or opening 24, through which the seeds are discharged by the stirrer. Said shaft 21 has a rock-arm 25 at one end. When said rock-arm is connected by a pitman 26 to the crank-arm 19, said shaft 21 is oscillated, as will be understood, thereby imparting rocking motion to the stirrers 22 and causing the latter to feed the cotton-seed from the hopper, as will be understood. A vertically-disposed standard 27 is attached to and vertically adjustable in the beam 1 and is located in advance of the hopper 14. A bed-sweep 28, which has a pair of rearwardly-diverging arms 29, is secured to and vertically adjustable on the said standard 27. A drill 30, which opens a furrow for the seeds, has at its front end a vertical arm 31, which is bolted or otherwise suitably secured to the rear side of the standard 27. Also secured to the rear side of said standard are covering-blades 32, which are vertically adjustable on the said standards.

A vertical standard 33 has its upper end disposed between the front ends of the bars 5. A lock-plate 34 is interposed between one of said bars 5 and one side of said standards. Said lock-plate engages the upper and lower sides of said bar 5 and is provided on its inner side with a transverse rib 35, which is adapted to fit any of a series of corresponding grooves in the opposing side of standard 33. A bolt 37 passes through the bars 5, through a vertical adjusting-slot 38 in said standard 33, and through said lock-plate. By this means the standard 33 may be vertically adjusted and secured at any desired adjustment, as will be understood. The said standard carries a wheel 39, which, in coaction with the vertically-adjustable standard 27 and the implement thereto attached, gages the depth of the furrows made in the soil, and hence enables the seeds to be planted uniformly at any required depth, and said wheel is provided on one side with a series of laterally-extending cams 40.

A fertilizer-hopper 41 is provided on its rear side with supporting-straps 42, which are detachably secured to the cross-bar 2, and has on its side walls forward-extending supporting-cleats 43, which rest upon similar cleats 44 on the inner sides of the bars 5. Thereby the said fertilizer-hopper is supported on the frame of the machine and is adapted to be readily detached therefrom when not in use. A cross-bar 45 connects the side walls of the fertilizer-hopper at a suitable distance above the lower end thereof. A stirring-rod 46 is pivotally attached to and vertically adjustable in said cross-bar by a pin 47, said stirring-rod having a series of adjusting-openings 48 for the pin. The lower end of the said stirring-rod is provided with a rearward-extending stirring-foot 40, which is disposed and operates in the discharge-opening 50 of the fertilizer-hopper, which opening is in the rear wall thereof and at the lower end of the hopper. A shaking-shoe 51 is disposed under the bottom of the fertilizer-hopper and is preferably of the form here shown. The front end of the said shaking-shoe is provided with a forward-extending strap 52, to which is attached a vibrating rod 53. A spring-hanger 54 has its upper end attached to the front wall of the fertilizer-hopper and its lower end attached to the said strap 52, as shown. Thereby the shoe 51 is supported in position under the hopper, in contact with the lower side thereof, and by reason of the flexibility of the spring-hanger 54 is adapted to be vibrated laterally. The vibrating arm or rod 53 is provided at its front end with an antifriction-roller 55, which is engaged and operated by the cams 40 of the wheel 39 as the latter revolves, and hence the said shoe is laterally vibrated when the machine is in operation, as will be understood. A gage-plate 56 is adjustable on the rear side of the fertilizer-hopper and enables the discharge-opening 50 for the fertilizer to be entirely cut off in order to discontinue the flow of fertilizer from the hopper or enables the said opening to be uncovered to any desired extent, and hence enables the quantity of the fertilizer discharged from the fertilizer-hopper to be readily predetermined and regulated.

When the machine is used as a planter, standards 57 are bolted to the side bars 3. Each of the said standards is provided at its lower portion with a foot 58, pivotally connected thereto, as at 59. Thereby the feet of the standards are adapted to swing rearward when the same encounter obstructions, and hence avoid breaking the standards. On each standard 57 is a clip 60, which is adjustable thereon and may be fixed thereto at any desired adjustment by a set-screw 61. A plate 62 is carried by the front side of the said clip. The lower portion of the said plate overlaps the upper portion of the pivoted foot of the standard. The said plate 62 is a flat spring, and by adjusting the same by means of the adjustable clip 60 the said spring-plate may be caused to overlap the upper end of the pivoted foot to any desired extent, and hence the pivoted foot may be caused to turn rearward under the standard when it encounters an obstruction, and the degree of force requisite to thus turn the foot may be predetermined. Hence the foot is prevented from turning when the same encounters trifling obstructions or obstructions which are insufficient to break or injure the standards.

The feet 58 of standards 57 carry ridging plows or wings 63, which may be of any suitable construction. To the under rear side of each of the pivoted feet 58 is bolted a runner 64. The same operate in the bottoms of the furrows formed by the ridging wings or plows and steady the frame of the machine and also serve to regulate the depth at which the said ridging wings or plows operate in the soil. The said runners are provided with adjusting-openings 65, by means of which the said runners may be vertically adjusted on the pivoted feet of the standards. In Fig. 6 I shown a bed-sweep 66, which when the machine is used for planting tobacco is bolted to the standard 27 in lieu of the bed-sweep 28 and forms ridges over the furrows in which the tobacco-seeds are planted.

In Fig. 7 of the drawings I show the machine as organized for planting corn. In the bottom of the hopper 14 is placed a spout 67, which is of the form shown and is struck up from a single sheet of metal. The sides of the said spout are inclined and bear against the inclined side walls of the hopper. Bearing-blocks 68 are placed in the sides of the hopper and secured thereto by set-screws 69. In the opposing ends of said bearing-blocks are seats 70 for the ends of the seed-cylinder 71. The latter is carried by a shaft 72, which has its bearings in said block 68 and in the side walls of the hopper, and is provided with a sprocket-wheel 73 at one end, which is connected to the sprocket-wheel 20 by an endless sprocket-chain 74. Thereby the seed-cylinder is rotated, as will be understood. In the rear side of the hopper is placed an adjustable plate 75, which has a vertical adjusting-slot 76. A set-screw 77, which operates in said slot, secures said plate in the rear side of the hopper. To the lower end of the said plate is secured a leather strip 78, which bears on the rear side of the seed-cylinder and prevents the escape of seeds from the hopper through the space between the opposing rear sides of the cylinder and hopper. A feed-gage 79 is disposed on the front side of the revoluble seed-cylinder, is provided with a vertical adjusting-slot 80, and is secured to and adjustable on the front wall of the hopper by a set screw or bolt 81. A brush 82 is carried by the said feed-gage and bears upon the seed-cylinder. The latter is provided with peripheral seed-cups 83, any number of which may be closed by suitable plugs 84. Thereby the spaces between the opened seed-cups may be regulated and the machine caused to plant the seeds at the desired distance apart.

When it is desired to use the machine for planting ginned or delinted cotton-seeds, I substitute a seed-cylinder 85 for the seed-cylinder 71 and substitute a feed-gage 86, having a series of teeth 87 on its lower side, for the feed-gage 79. The seed-cylinder 85 is provided with peripheral spurs 88, which are disposed diagonally on the said cylinder, are removable therefrom, and are secured thereto by means of screws 89. Each of the said spurs, which is of a size suitable to engage a single cotton-seed, has a concaved face 90. The spurs 88 of the seed-cylinder and the teeth 87 of the feed-gage 86 are intercurrent.

When the machine is used for planting in check-rows, the roller 17 is provided with a marking-spur 91, as indicated in Fig. 2 of the drawings.

Having thus described my invention, I claim—

1. The combination of a hopper having a discharge-opening in its rear side, a vibrating shoe forming the bottom of the hopper, and a stirring-bar pivotally supported in the hopper, said stirring-bar being connected to the said vibrating shoe, substantially as described.

2. The combination of a hopper having a discharge-opening in its rear side, a vibrating shoe forming the bottom of the hopper, and a stirring-bar pivotally supported in the hopper, said stirring-bar being connected to the said vibrating shoe and at its lower end having a rearward-extending arm which operates in the discharge-opening of the hopper, substantially as described.

3. The combination of a hopper, a shoe onto which the hopper discharges, a spring-hanger supporting the shoe and means to vibrate the latter, substantially as described.

4. The combination of a hopper having a discharge-opening in its rear side, a vibrating shoe forming the bottom of the hopper, a spring-hanger supporting the front end of the shoe, a vibrating arm projecting from the shoe and a cam-wheel to vibrate said arm, substantially as described.

5. The combination of a hopper having a discharge-opening in its rear side, a vibrating shoe forming the bottom of the hopper, an adjustable gage-plate on the said opening, and a stirring-bar pivotally supported in the hopper, said stirring-bar being connected to said vibrating shoe and having a rearward-extending arm which operates in the discharge-opening of the hopper, substantially as described.

In testimony that I claim the foregoing as my own I have hereto affixed my signature in the presence of two witnesses.

ANDREW J. WEST.

Witnesses:
E. O. BRANSFORD,
J. T. REDFIELD.